(12) United States Patent
Weir-Jones

(10) Patent No.: US 10,731,968 B2
(45) Date of Patent: Aug. 4, 2020

(54) SYSTEMS AND METHODS FOR MONITORING STRUCTURAL INTEGRITY OF SLOPES

(71) Applicant: Weir-Jones Engineering Consultants Ltd., Vancouver (CA)

(72) Inventor: Iain Weir-Jones, Vancouver (CA)

(73) Assignee: Weir-Jones Engineering Consultants Ltd., Vancouver (CA)

(*) Notice: Subject to any disclaimer, the term of this patent is extended or adjusted under 35 U.S.C. 154(b) by 0 days.

(21) Appl. No.: 16/376,997

(22) Filed: Apr. 5, 2019

(65) Prior Publication Data

US 2019/0331477 A1 Oct. 31, 2019

Related U.S. Application Data

(60) Provisional application No. 62/654,130, filed on Apr. 6, 2018.

(51) Int. Cl.
*G01B 11/16* (2006.01)
*G01L 1/24* (2006.01)

(52) U.S. Cl.
CPC ............ *G01B 11/16* (2013.01); *G01L 1/242* (2013.01)

(58) Field of Classification Search
CPC ........ G01B 11/18; G01B 17/04; G01B 11/06; G01B 11/165; G01B 11/25; G01B 11/2513; G01B 11/26; G01L 1/242; G01L 11/025; G01L 5/0052; G01N 19/00; G01N 2021/0118; G01N 2021/1793; G01N 2021/8829; G01N 2021/8887; G01N 21/47; G01N 21/552; G01N 21/84; G01N 2201/0886; G01N 25/18; G01N 33/383; G01N 33/4833

See application file for complete search history.

(56) References Cited

U.S. PATENT DOCUMENTS

| | | | |
|---|---|---|---|
| 5,567,932 | A | 10/1996 | Staller et al. |
| 6,380,534 | B1 | 4/2002 | Farhadiroushan et al. |
| 6,698,919 | B2 | 3/2004 | Chi et al. |
| 6,813,403 | B2 | 11/2004 | Tennyson |
| 7,050,683 | B2 | 5/2006 | Dofher |

(Continued)

FOREIGN PATENT DOCUMENTS

| | | |
|---|---|---|
| CN | 202195827 | 4/2012 |
| CN | 102109362 | 5/2012 |

(Continued)

OTHER PUBLICATIONS

Dijcker et al., Geotextile enabled smart monitoring solutions for safe and effective management of tailings and waste sites. Nov. 30, 2011. Retrieved from http://elk.library.ubc.ca/handle/2429/38756.

(Continued)

*Primary Examiner* — Michael P Stafira
(74) *Attorney, Agent, or Firm* — Todd A. Rattray; Oyen Wiggs Green & Mutala LLP

(57) ABSTRACT

A system is described in which one or more loops of single mode optical fiber are buried in a face or crest of a slope such as a tailings dam. An optical interrogator such as a Brillouin frequency domain interrogator sweeps the optical fiber to measure strain and temperature at locations distributed along the length of the optical fiber.

13 Claims, 11 Drawing Sheets

(56) References Cited

U.S. PATENT DOCUMENTS

| | | | |
|---|---|---|---|
| 7,245,790 | B2 | 7/2007 | Brown et al. |
| 7,324,732 | B2 | 1/2008 | Jamison et al. |
| 7,630,591 | B2 | 12/2009 | Allen et al. |
| 8,203,707 | B2 | 6/2012 | Xu |
| 8,699,009 | B2 | 4/2014 | Li et al. |
| 8,746,074 | B2 | 6/2014 | Lambert |
| 8,953,915 | B2 | 2/2015 | Sarchi et al. |
| 2002/0020224 | A1 | 2/2002 | Sato et al. |
| 2004/0258373 | A1 | 12/2004 | Andreassen |
| 2009/0121477 | A1* | 5/2009 | Pradeilles ............ E03C 1/06 285/146.1 |
| 2009/0132183 | A1* | 5/2009 | Hartog ............ G01D 5/35303 702/42 |
| 2009/0265193 | A1* | 10/2009 | Collins ............ G06Q 30/0185 705/4 |
| 2009/0303460 | A1* | 12/2009 | Habel ............ D04B 21/16 356/32 |
| 2011/0058778 | A1 | 3/2011 | Herbst |
| 2011/0229099 | A1 | 9/2011 | Hartog et al. |
| 2016/0260297 | A1* | 9/2016 | Ashoori ............ A41D 1/002 |

FOREIGN PATENT DOCUMENTS

| | | | |
|---|---|---|---|
| CN | 202648831 | | 1/2013 |
| CN | 203349790 | | 12/2013 |
| CN | 103528535 | | 1/2014 |
| CN | 203501982 | | 3/2014 |
| CN | 102706477 | | 4/2014 |
| CN | 204902782 | U * | 12/2015 |
| JP | 11326149 | | 11/1999 |

OTHER PUBLICATIONS

Hayashi et al., Large strain sensing using Brillouin scattering in perfluorinated graded-index polymer optical fiber. pp. 1-5, Jul. 31, 2013. Retrieved from http://search.proquest.com/professional/docview/1442328117/14DAB0851EE62983350/1?accountid=157282.

Application Note: 0013, Brillouin DSTS System for Intelligent Dam and Levee Monitoring. Jun. 30, 2015. http://www.ozoptics.com/ALLNEW_PDF/APN0013.pdf.

* cited by examiner

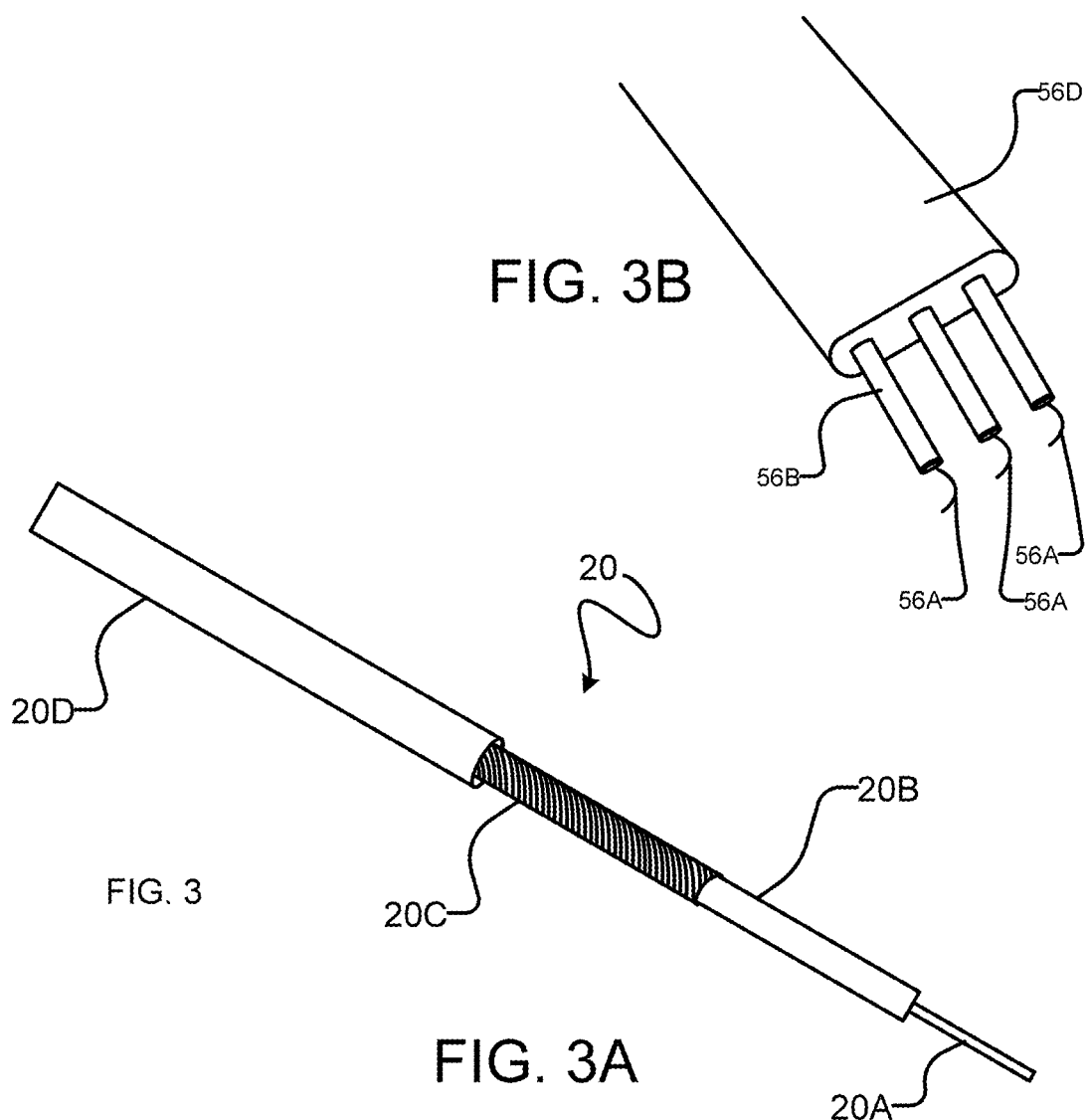
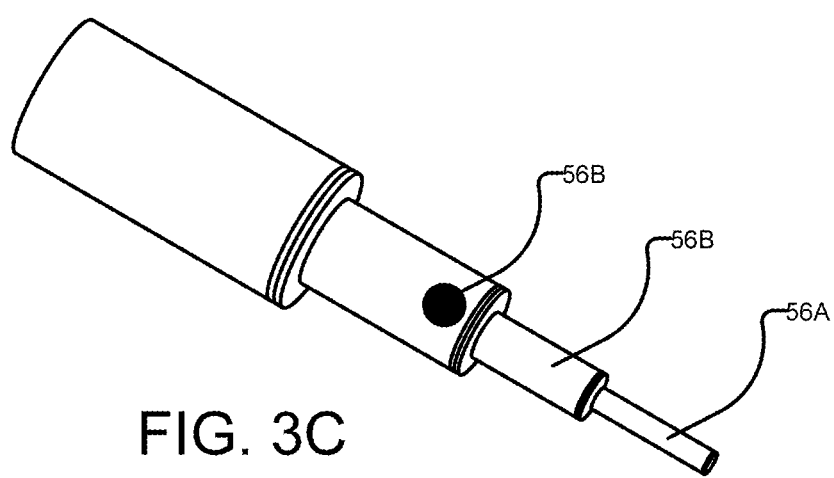

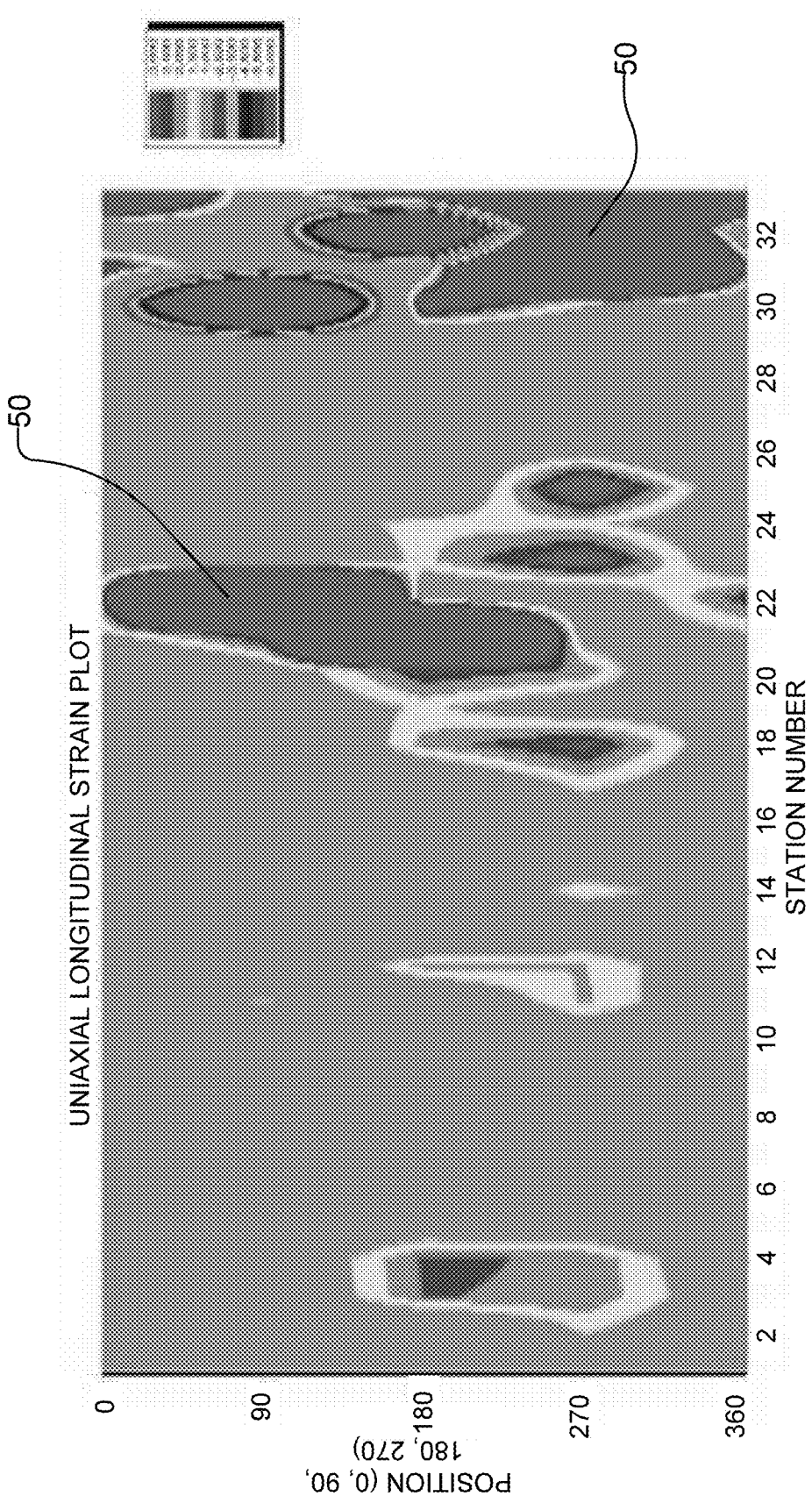

SYSTEMS AND METHODS FOR MONITORING STRUCTURAL INTEGRITY OF SLOPES

RELATED APPLICATIONS

This application claims the benefit under 35 USC 119(3) of U.S. application No. 62/654,130 filed 6 Apr. 2018, which is hereby incorporated herein by reference.

TECHNICAL FIELD

Systems and methods provide early detection of indicators of decreasing stability of slopes such as early-state movements within tailings dams, other impoundment structures, natural slopes and/or engineered slopes.

BACKGROUND

Slopes, including those of tailings dams, other types of impoundment structures, pipeline slopes, natural slopes and/or engineered slopes, any of which may be composed of soil, sand or clay (e.g. retaining walls, dykes, highway embankments) may present a potential threat of instability or failure. Deterioration of the slope can result from natural causes, such as seismic events, abnormal weather conditions and the like or from a failure of the owner/operator of the slope to recognize decreasing stability. Monitoring systems may be used to predict and even prevent catastrophic failures.

The majority of geotechnical and geological processes develop in an incremental manner. Dam and slope failures are progressive and tend to commence with small precursor events, which may increase in magnitude over time. Accordingly, strain data from the dam or slope may provide engineers with the desired information for identifying small incremental changes in the dam structure.

Brillouin optical methods, such as Brillouin optical time domain analysis and Brillouin optical frequency domain analysis, have been used to measure strain and temperature on surfaces of bridges, and dams. Measurement of strain and temperature has been used to identify deterioration and changes in structural integrity.

There is a general desire to monitor the structural integrity of slopes including impoundment structures and, where possible, provide early warning of possible stability risks and/or possible failure of the slope.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a system for monitoring structural integrity of a slope, the system comprising one or more loops of single mode optical fiber in contact with the slope and an optical interrogator, such as a Brillouin frequency domain interrogator, for measuring strain at one or more locations along a length of the one or more loops of single mode optical fiber.

Other aspects of the invention may provide that at least one of the one or more loops of single mode optical fiber are embedded in one or more substantially vertical boreholes drilled into the slope, that at least one of the one or more loops of single mode optical fiber is located in one or more substantially horizontal channels embedded in the slope, the one or more substantially horizontal channels disposed substantially parallel to a crest of the slope, or that at least one of the one or more loops of single mode optical fiber is located in one or more inclined channels (e.g. channels that are not substantially vertical or substantially horizontal) embedded in the slope.

An aspect of the invention provides a system for monitoring structural integrity of a slope, the system comprising: one or more loops of single mode optical fiber in contact with the slope; and a Brillouin frequency domain interrogator for measuring strain at one or more locations along a length of the one or more loops of single mode optical fiber.

An aspect of the invention provides a method of monitoring structural integrity of a slope, the method comprising the steps of sweeping one or more loops of single mode optical fiber with a source of light, recording a signal in the single mode optical fiber, analyzing the signal using Brillouin optical frequency domain analysis (BOFDA), and, by such BOFDA analysis, identifying locations within the optical fiber experiencing strain.

At least one of the one or more loops of single mode optical fiber may be embedded in one or more substantially vertical boreholes formed in the slope. The one or more substantially vertical boreholes may extend substantially vertically from a crest of the slope and into the slope.

At least one of the one or more substantially vertical boreholes may extend substantially vertically from a bench (e.g. a generally horizontal bench) on a face of the slope. The one or more benches may be on a downstream surface of the slope.

The substantially vertical boreholes may extend downwardly to a stable foundation underlying the slope. The stable foundation may comprise bedrock or stable ground predating the formation of the slope.

The Brillouin frequency domain interrogator may measure temperature at one or more locations along a length of the one or more loops of single mode optical fiber.

At least one of the one or more loops of single mode optical fiber may comprise one or more elongated sections, each elongated section may be located in a corresponding substantially horizontally elongated channel embedded in the slope. The one or more substantially horizontally elongated channels may be disposed substantially parallel to a crest of the slope.

Each elongated section may be embedded in a corresponding channel disposed substantially parallel to a gradient of the slope. Each elongated section may be embedded in a corresponding channel disposed substantially transverse to a gradient of the slope.

The one or more loops of single mode optical fiber may comprise a jacket and an optical core. The jacket may be closely coupled to move with the optical core for transferring external strain to the optical core.

A second loop of optical fiber may be provided alongside the one or more loops of single mode optical fiber. The second loop of optical fiber may comprise a second jacket and a second optical core. The second jacket may be loosely coupled to the second optical core (e.g. relative to the close coupling between the jacket and optical core of the one or more loops of single mode optical fiber) such that the second loop of optical fiber is less sensitive (e.g. than the one or more loops of single mode optical fiber) to external strain. Measurements from the second loop of optical fiber may be compared to measurements from the one or more loops of single mode optical fiber to arrive at temperature measurements representative primarily of strain without the effect of temperature.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 3A to 3C are isometric views of partially stripped optical fiber cables showing the interior of a cables.

FIG. 5B is a cumulative strain contour plot for a portion of a pipeline.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Brillouin scattering in optical fiber describes the interaction of an electromagnetic field with a characteristic density variation of the fiber. Brillouin Optical Frequency Domain Analysis (BOFDA) is a known technique for using optical fiber as a form of sensor—e.g. to measure perturbations which may occur in a vicinity of the fiber. Typically, a first optical signal (often referred to as the pulse or the pump) and a second optical signal having a lower Brillouin frequency (often referred to as the probe) are introduced into the fiber by an interrogator. The interaction (e.g. constructive and destructive interference) between the pump and the probe waves may create a modified density profile in the fiber, which causes a corresponding change in the index of refraction profile in the fiber and corresponding optical scattering known as stimulated Brillouin scattering. The density profile in the fiber and the corresponding index of refraction are also influenced by local temperature and strain. Measurement of static or dynamic characteristics of Brillouin scattering frequency at various locations along the fiber can be used to sense local temperature and strain at various locations (e.g. intervals on the order of 0.2 m) over tens or even hundreds of kilometers of fiber.

Figure 1A:
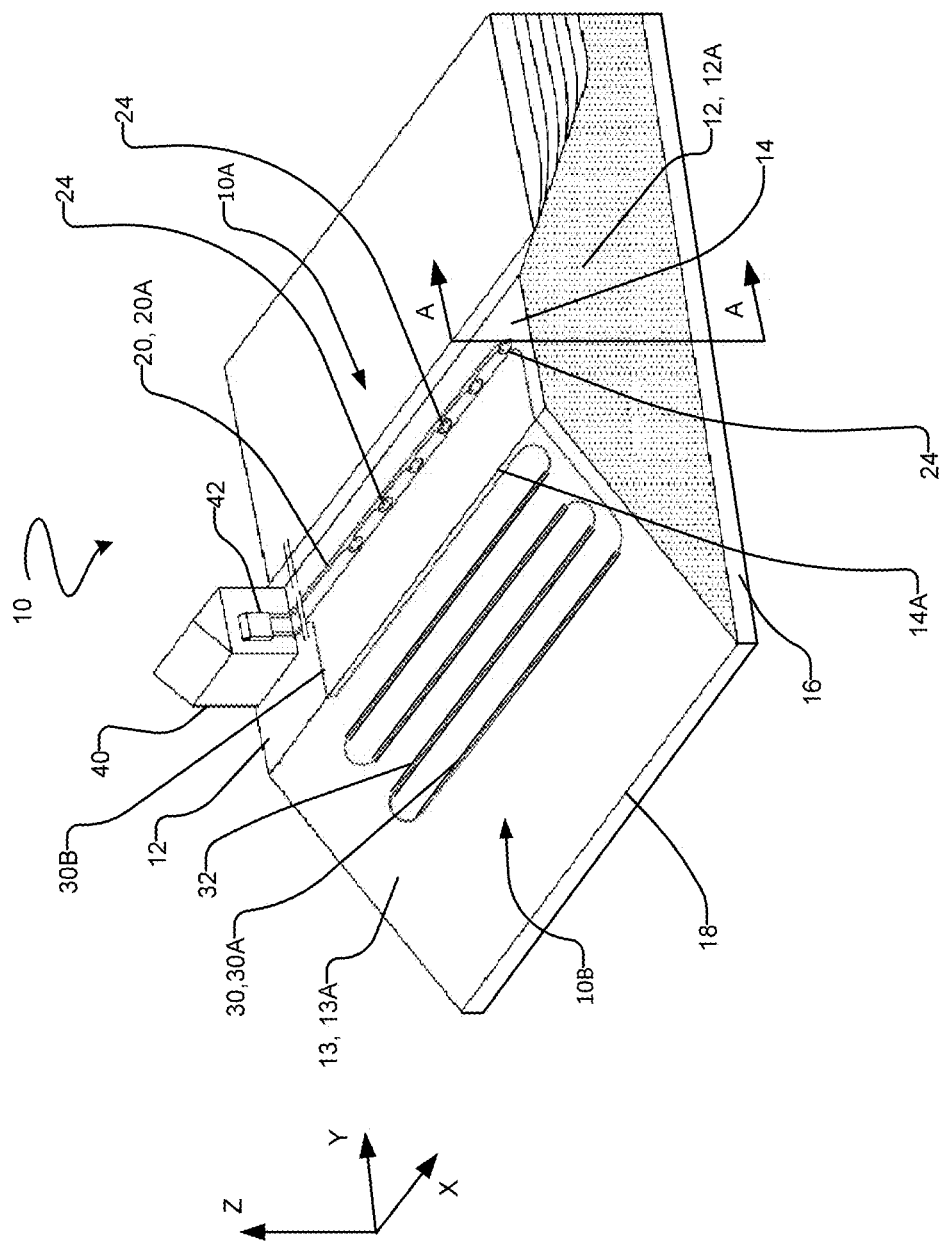
FIG. 1A is an isometric view of a slope with two loops of optical fiber installed in the face and interior of the slope.
Figure 1B:
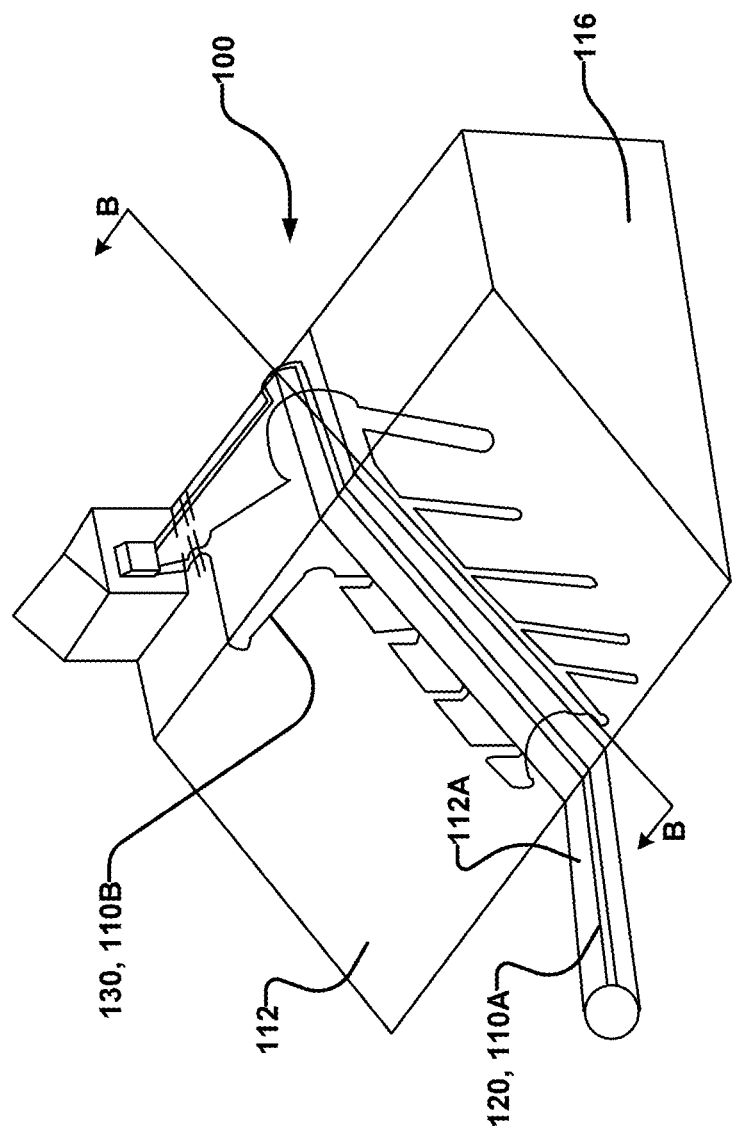
FIG. 1B is an isometric view of a slope with one loop of optical fiber installed in the face of the slope and one loop of optical fiber installed along a pipeline.
Figure 2A:
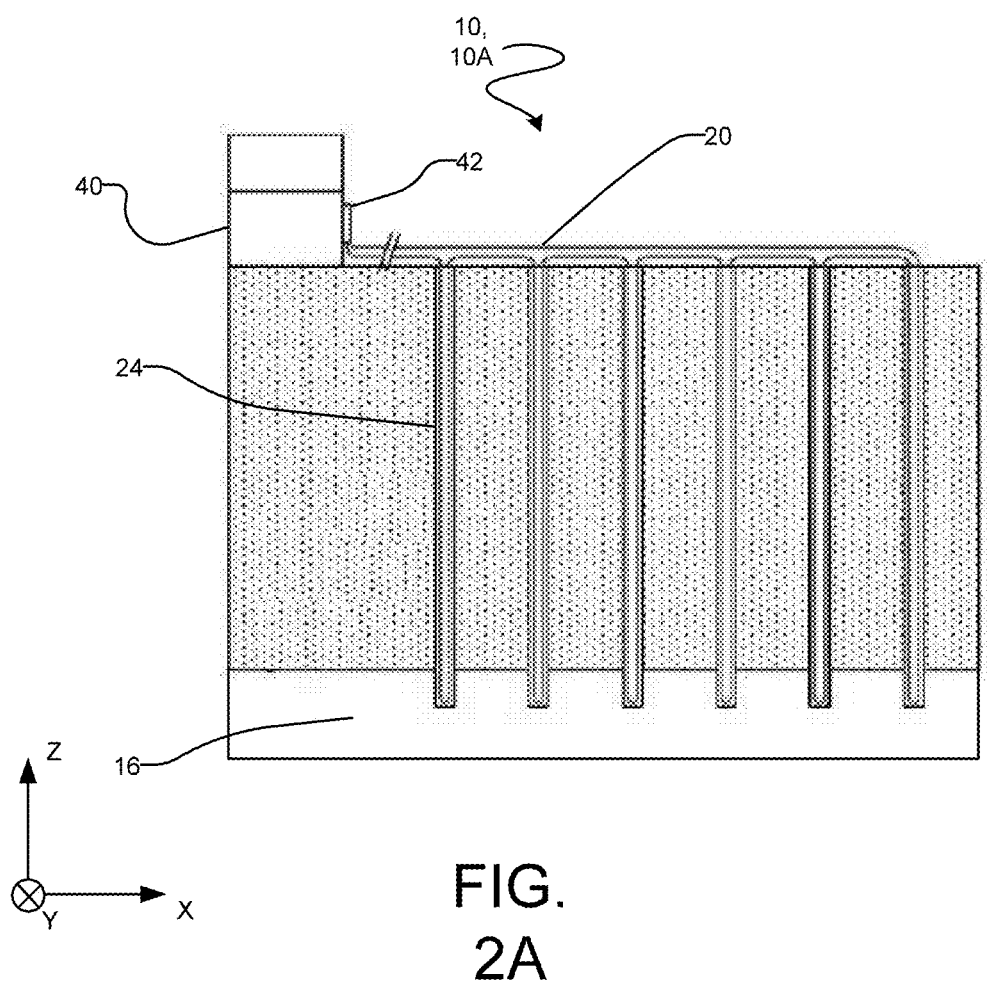
FIG. 2A is a section view of the slope of FIG. 1A viewed along the line A-A.
Figure 2B:
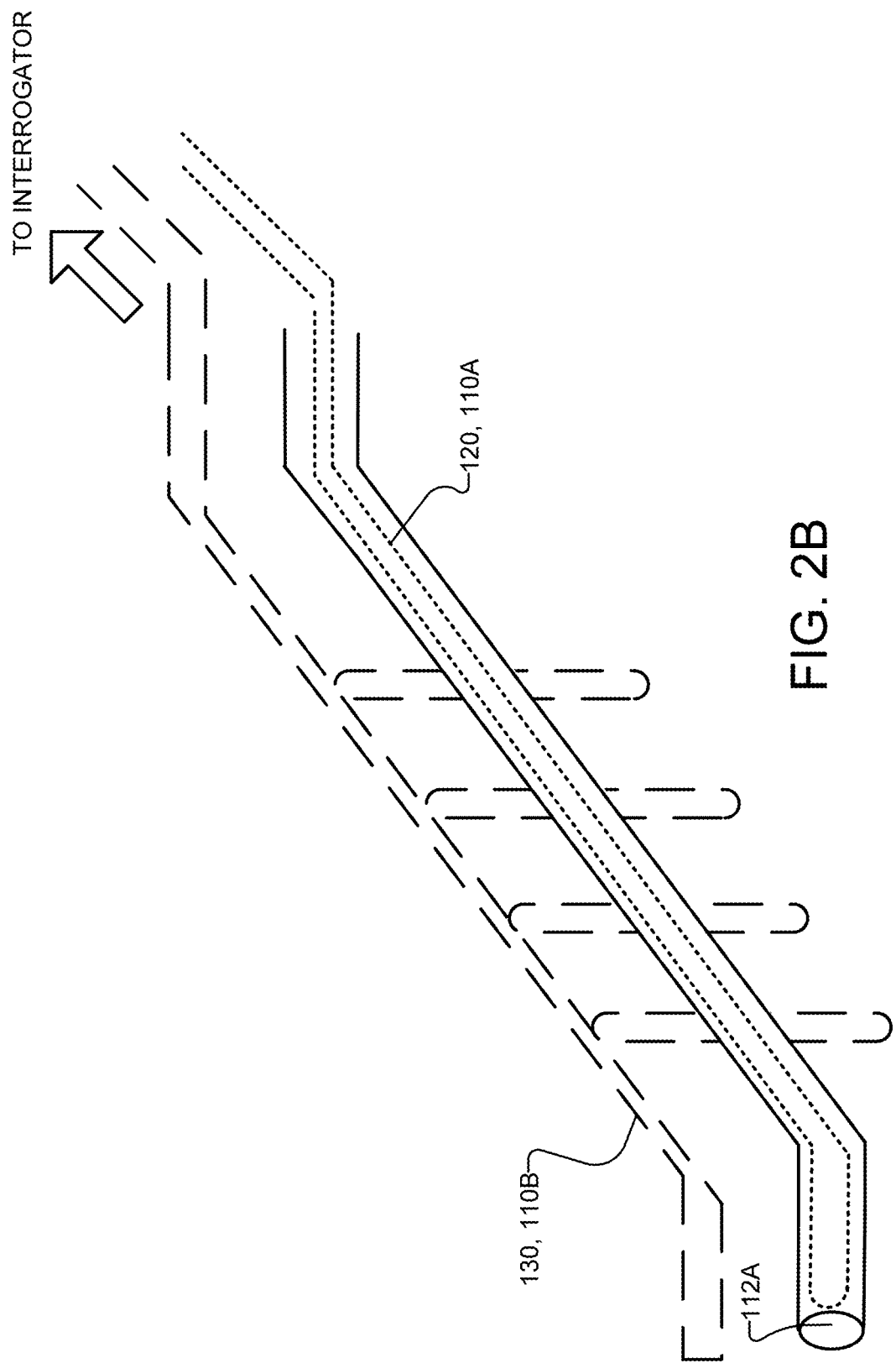
FIG. 2B is a section view of the slope of FIG. 1B viewed along the line B-B.

FIGS. 1A and 2A depict a system 10 for monitoring a slope 12, such as a slope of a tailings dam 12A, according to a particular embodiment. While system 10 is illustrated in use in connection with the monitoring of a tailings dam 12A, system 10 could additionally or alternatively be used (by adopting similar techniques as described herein) on other kinds of slopes and/or structures, such as (without limitation) an impoundment structure or any kind of embankments containing fluids, semi-fluids and semi-solids, natural slopes and/or engineered slopes. For example, FIGS. 1B and 2B depict a system 100 for monitoring a slope 112 along which a pipeline 112A runs and for monitoring pipeline 112A itself.

Tailings dams 12A are frequently constructed from earth-fill, but may use other materials such as rock-fill, concrete, tailings or a combination thereof. System 10 of the illustrated embodiment shows two Brillouin fiber subsystems 10A, 10B in tailings dam 12A. In the first subsystem 10A, optical fiber 20 is installed along the interior of boreholes 24 drilled generally vertically through the dam 12A from a crest 14 of dam 12A into an underlying stable foundation 16, such as bedrock or stable ground predating dam 12A. By looping optical fiber 20 back over itself in each borehole 24, a single length of optical fiber cable 20 may be used to implement subsystem 10A. One or more low loss optical connectors may be provided at a collar of each borehole 24 to allow for extension of optical fiber 20 in the case of extension of the borehole. Alternatively, spare cable 20 may be provided (e.g. coiled) to allow for extension of boreholes 24. Fiber 20 in boreholes 24 may function like a continuous biaxial inclinometer, by providing data which facilitates the calculation of the lateral strains (in the X and Y directions shown in FIG. 1A) under dam 12A.

Optical fiber 20 of the first subsystem 10A can also detect vertical strains (in the Z direction shown in FIG. 1) which tend to elongate or compress fiber 20 along the longitudinal (generally vertical) axis of boreholes 24. In some embodiments (not shown in FIG. 1A), vertical boreholes 24 and optical fiber 20 of the first subsystem 10A may additionally or alternatively be installed on the downstream (away from the water) side 13 of dam 12A and may extend down from the surface of the downstream side 13 into an underlying stable foundation 16. Such installations on the downstream side 13 of dam 12A may be used particularly where the downstream side 13 of dam 12A is benched—i.e. the downstream side 13 of dam 12A comprises one or more generally horizontally extending "benches". While system 10, including first subsystem 10A is described herein as being employed on a dam 12A, this is not required. System 10, including first subsystem 10A may also be employed on any slope described herein, such as a natural slope or engineered slope.

Figure 4A:
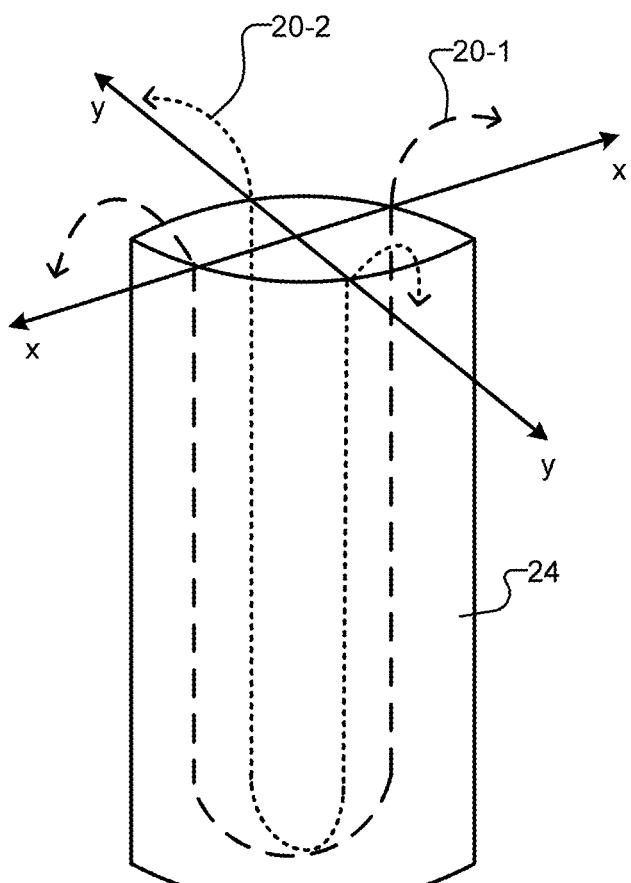
FIG. 4A is a schematic representation of a pair of loops of optical fiber installed in a borehole.

In some embodiments, two loops of optical fiber 20 are provided in each borehole 24 such as is depicted in FIG. 4A. In some embodiments, a first loop of optical fiber 20-1 may provide monitoring in the X direction while a second loop of optical fiber 20-2 may provide monitoring in the Y direction.

In other embodiments, each of first and second loops of optical fiber 20-1, 20-2 provide both X and Y direction monitoring to some extent.

Figure 4B:
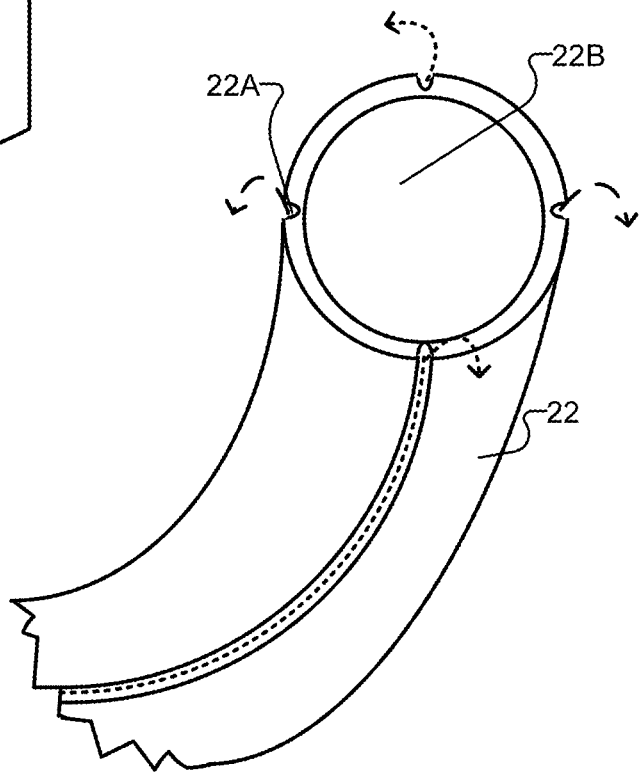
FIG. 4B is an isometric view of a portion of a carrier for a pair of loops of optical fiber for installation in a borehole.

To facilitate installation of optical fiber 20 in boreholes 24, a carrier 22 may be provided. FIG. 4B depicts a carrier 22 for installing two loops of optical fiber having lengths that are spaced apart at 90° intervals around the circumference of carrier 22. Each loop or portion of a loop of optical fiber 22 may be located in a channel 22A of carrier 22. Carrier 22 may therefore serve to maintain the relative spaced apart locations of each loop or portion of loop of optical fiber 20. Carrier 22 may be sufficiently rigid to aid in extending optical fiber 20 into borehole 24 and may therefore allow less rigid optical fiber 20 to be employed. In some embodiments, carrier 20 (with or without optical fiber 20) may be coiled for transportation and uncoiled as it is installed in borehole 24. Carrier 24 may be annular, having a hollow center 22B to allow for fluid, mud, backfill, grout or the like to be pumped into or out of borehole 24.

Figure 4C:
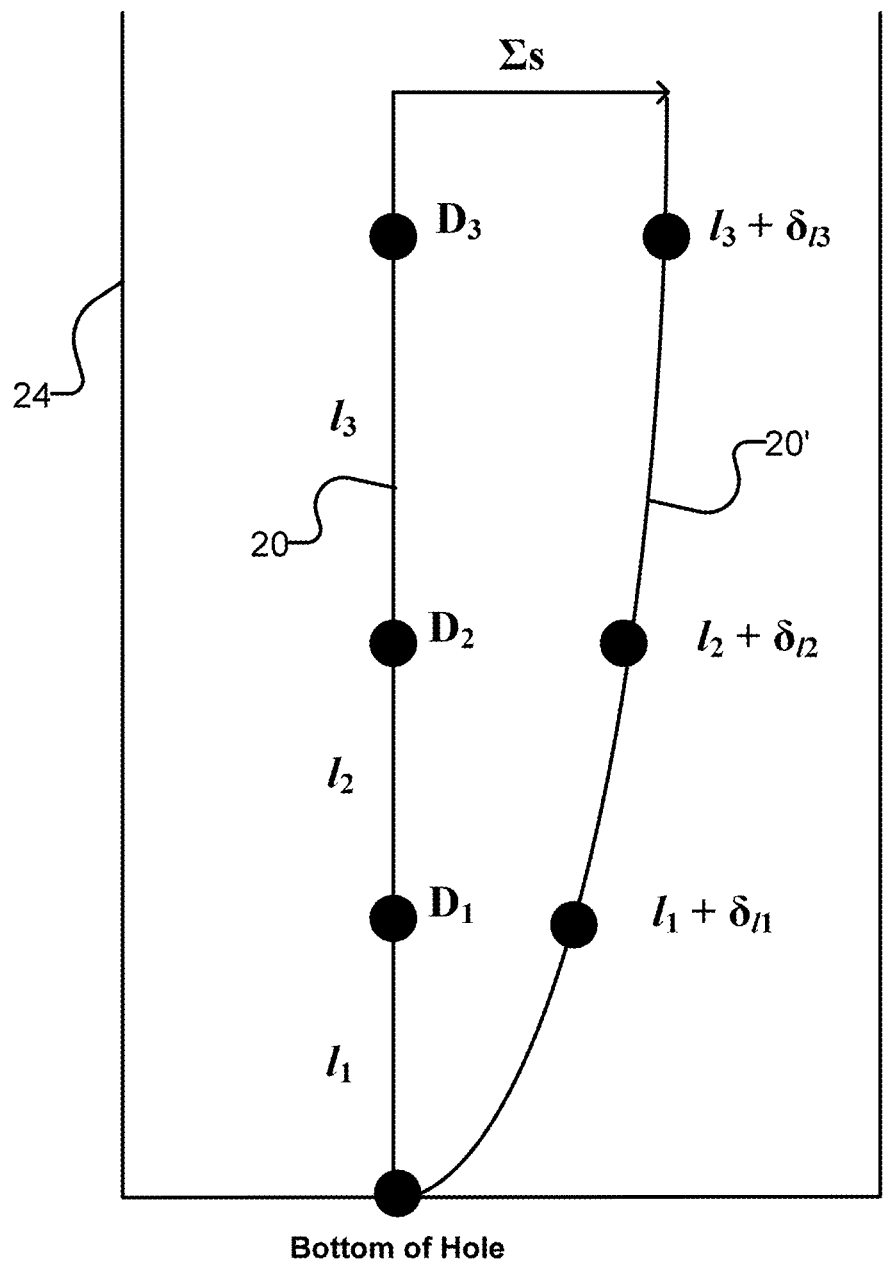
FIG. 4C is a schematic representation of the displacement of a portion of a loop of optical fiber installed in a borehole.

As shown in FIG. 4C, fiber 20 in boreholes 24 may measure the change in attitude of boreholes 24 by making a series of adjacent incremental measurements (e.g. $I_1$, $I_2$, $I_3$, etc.) parallel to the longitudinal axis of fiber 20. As slope 12 moves, fiber 20 is subject to strain and changes shape such as depicted by fiber 20'. Relative to a fixed point, the cumulative motion, $\Sigma_s$, of such incremental measurements of fiber 20' can be derived by summing the movement (e.g. $\delta_{f1}$, $\delta_{f2}$, $\delta_{f3}$, etc.) of all of the adjacent incremental measurements. Accordingly, the changes in length in each incremental measurement may allow for the shape of the increment to be determined.

In addition to inserting optical fiber 20 into boreholes 24, subsystem 10A may also comprise the insertion of grout or other strain transferring material (not expressly enumerated) into boreholes 24. Such grout may fill boreholes 24 and may provide a medium for transferring strain from the surrounding dam 12A to the optical fiber 20. In some embodiments, the grout may comprise bentonite grout, a mixture of bentonite and cementitious material and/or a low modulus grout. In some embodiments, a backfilling material is provided into boreholes 24 that has a similar or lower stiffness (e.g. modulus) to the material(s) that make up slope 12. For example, in some embodiments, where slope 12 is part of a tailings dam, the backfill may comprise tailings or tailings with bentonite to prevent vertical migration of water. In some embodiments, the backfill may comprise sand. In some embodiments, one or more water blocking elements may be provided in boreholes 24 to reduce the risk of run-off channeling into the boreholes.

The second subsystem 10B of system 10 comprises optical fiber 30 located atop the face 13A of downstream side 13 of dam 12A and/or buried in shallow (e.g. less than 1000 mm in some embodiments and less than 200 mm in some embodiments and less than 100 mm in some embodiments) trenches 32 on the face 13A of downstream side 13 of dam 12A. Fiber 30 can be laid to provide elongated portions 30A which extend in lateral directions (i.e. combinations of X and Y directions in the illustrated embodiment). Elongated portions 30A of fiber 30 may extend in directions generally parallel to the toe edge 18 and/or crest edges 14A of dam 12A and/or generally parallel to the edges of any benches (not shown) on downstream side 13. Fiber 30 may also extend in directions generally orthogonal to the vertically oriented fiber 20 located in boreholes 24 of first subsystem 10A. In other embodiments, elongated portions 30A of fiber 30 may be laid along the downstream face 13A of dam 12A, to extend generally orthogonal to the crest edge 14A or toe edge 18 of dam 12A and parallel to the gradient of downstream face 13A. In some embodiments, fiber 30 may be installed or embedded in the downstream face 13A of dam 12A during initial construction or raising of dam 12A. Although not depicted, in some embodiments, first subsystem 10A, second subsystem 10B or another subsystem similar to one or both of first and second subsystems 10A, 10B may be installed on an upstream side 15 (e.g. the side toward the water or tailings of dam 12A) and/or the upstream face 15A of dam 12A.

Where fiber 30 of subsystem 10B is buried in trenches 32, fiber 30 may be buried on the order of ~100 mm (e.g. less than 200 mm in some embodiments and less than 100 mm in some embodiments) deep (in the Z-direction) with a base width on the order of ~100 mm (e.g. less than 200 mm in some embodiments and less than 100 mm in some embodiments). In some embodiments, trenches 32 may be deeper and/or wider. Trenches 32 may be appropriately dimensioned for the desired locations of fiber 30 and the field conditions. The trenching and placement of fiber 30 may ensure that fiber 30 moves in the same manner as the surrounding soil or other slope material. Material surrounding buried optical fiber 30 may be compacted to ensure strain is effectively transferred to optical fiber 30. Soil reaction anchors may be attached to fiber 30. Displacement, settlement and/or tensile cracking of the material and structure of dam 12A in regions surrounding trenches 32 may result in corresponding deformation of fiber 30 and allows for detection of those deformations using BOFDA techniques. While FIG. 1A shows one loop 20A of optical fiber 20 for first subsystem 10A and one loop 30B of optical fiber 30 for second subsystem 10B, each of subsystems 10A, 10B could be implemented with additional loops of optical fiber.

FIGS. 1B and 2B depict a system 100 for monitoring a slope 112 supporting a pipeline 112A, according to a particular embodiment. System 100 is substantially similar to system 10 except in that first subsystem 110A comprises optical fiber 120 installed axially along pipeline 112A and second subsystem 110B comprises optical fiber 130 installed along the interior of boreholes 124 drilled generally vertically through slope 112 from face 113 into an underlying stable foundation 116, such as bedrock or stable ground predating pipeline 112A. In some embodiments, pipeline 112A is buried in slope 112. In other embodiments, pipeline 112A is supported above slope 112. In some embodiments, fiber 120 is attached to a surface of pipeline 112A. In some embodiments, fiber 120 is installed adjacent to pipeline 112A in a ditch or a trench.

Figure 5A:
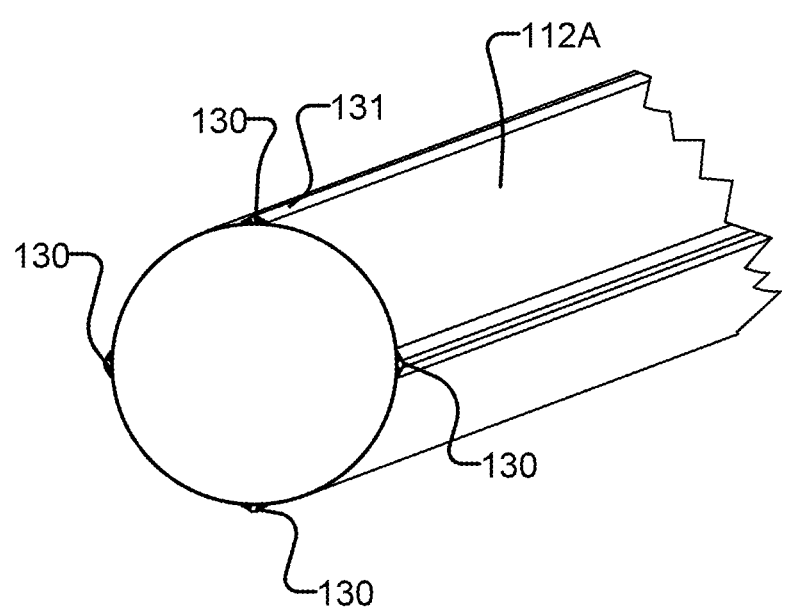
FIG. 5A is an isometric view of a portion of a pipeline with optical fiber running longitudinally along the pipeline.

In some embodiments, optical fiber 130 is attached to pipeline 112A and extends parallel to a longitudinal axis of pipeline 112A such as is depicted in FIG. 5A. Optical fiber 130 may be attached to pipeline 112A using a suitable adhesive 131. Prior to applying adhesive to pipeline 112A, a portion of the surface of pipeline 112A may be cleaned using, for example, acetone, methyl ethyl ketone, or the like. Such cleaning may be employed to remove a glaze from pipeline 112A and/or to improve bonding of optical fiber 130 to pipeline 112A. In some embodiments, a plurality of separate or connected lengths of optical fiber 130 are attached to pipeline 112A to provide monitoring at various points around the circumference of pipeline 112A. In some embodiments, optical fibers 130 are spaced apart at equal intervals (e.g. four fibers at 90° or three fibers at 120°, although this is not necessary. For example, in FIG. 5A, four optical fibers 130 spaced apart at 90° intervals are attached to pipeline 112A and extend parallel to the longitudinal axis of pipeline 112A. Fibers 130 may be attached to pipeline 112A before pipeline 112A is installed on or in slope 112 or after pipeline 112A is installed on or in slope 112. Although not depicted, an additional optical fiber may be installed on pipeline 112A (e.g. parallel to the longitudinal axis of pipeline 112A) to measure temperature.

The fiber optic cable 20, 30 itself may comprise a single mode communications fiber; however, the Brillouin fiber used in some embodiments may differ from conventional communications fiber in the structure of the jacket coupled to the fiber 20, 30. FIG. 3 shows a Brillouin fiber optic cable 20 which may be used for either or both of cables 20, 30 of subsystems 10A, 10B. The jacket structure of Brillouin fiber 20 may facilitate strain transfer from the medium in which fiber 20 is installed to the light-carrying portion of the fiber itself. The fiber optic cable 20 shown in FIGS. 3A and 3B have been stripped to show the core 56A (which carries light), cladding 56B, buffer 56C and jacket 56D.

Construction of fiber optic cable 20 may be intended to facilitate light transmission with minimal loss. Core 56A may comprise a single mode fiber. In some embodiments, core 56A may have a diameter of between approximately 50-200 microns or between approximately 100-150 microns. Core 56A may be surrounded by a cladding 56B. Cladding 56B may be employed to reduce optical loss of fiber 20 by causing internal reflection of the light travelling along core 56A. The external diameter of cladding 56B may be between approximately 200-300 microns. Cladding 56B may be covered by buffer 56C. Buffer 56C may be a protective layer. Buffer 56C may comprise a polymer layer. Buffer 56C may be transparent. Jacket 56D may provide external armouring or mechanical strength to fiber 20 to protect core 56A, cladding 56B, and buffer 56C. As shown in FIG. 3B, a plurality of optical components (e.g. core 56A, cladding 56B and/or buffer 56C) may incorporated into a single jacket 56D. The FIG. 3B embodiment may provide redundant measurement capabilities and may have a greater ability to withstand damage.

In some embodiments, the optical components may be bonded to jacket 56D (as compared to communication fibers which are typically loose inside of an armoured jacket), and/or the jacket configuration may be selected to develop high frictional forces with the surrounding material to ensure that the strain in the surrounding material is reliably transmitted through the jacket to the sensing fibres. In the case of pipelines outer jacket 56D may be bonded to the pipe surface so that it moves as one with the pipe. In some embodiments, jacket 56D is chosen to be abrasion resistant and/or remain flexible at low temperatures (e.g. −40° C.). In some embodiments, jacket 56D is chosen to be unattractive to rodents, and/or capable of forming strong stable bonds when adhered to pipe or other structural surfaces.

Figure 3D:
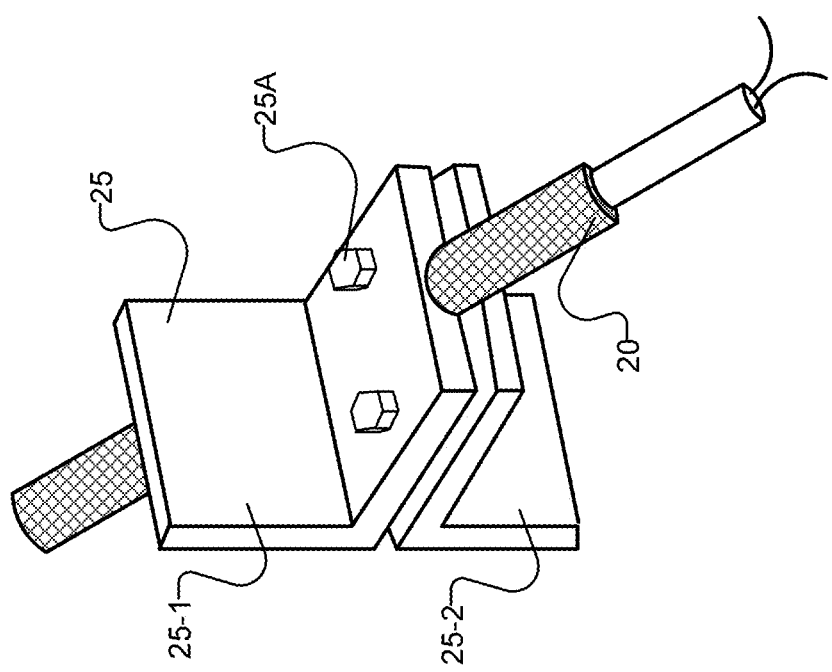
FIG. 3D is an isometric view of a compaction anchor for a cable.

FIG. 3A shows a ribbed Brillouin fiber 20 usable for direct burial. When embedding the Brillouin fiber 20 directly (e.g. in system 10 of FIG. 1), compaction or anchors may also be used to enhance strain coupling to the medium. FIG. 3D depicts a compaction anchor 25 according to one embodiment. Compaction anchors may be attached to fiber 20 to anchor fiber 20 into the surrounding soil. Accordingly, fiber 20 may be more sensitive to movement of the surrounding soil due to the interaction between the soil and anchor 25 which causes fiber 20 to move with the soil. Compaction anchors 25 may be attached to fiber 20 by attaching first and second halves 25-1, 25-2 together around fiber 20 with any suitable fasteners 25A.

In some embodiments, each of cables 20, 30 shown in FIG. 1 may comprise two or more pairs of light conducting fibers: some fiber pairs may be tightly coupled to their jacket and some fiber pairs may be loosely coupled to their jacket. The tightly coupled fiber pair(s) may be used to measure a combination of strain and temperature in the surrounding medium, whereas the loosely coupled pair(s) may be relatively less sensitive to strain (because of loose coupling to the jacket) and, consequently, may provide information related primarily to temperature. Strain measurements can then be extracted from the combination of the loosely coupled fiber pair(s) (sensitive primarily to temperature) and the tightly coupled fiber pair(s) (sensitive to both temperature and strain). For example, the temperature effects detected by the loosely-coupled fiber pair(s) may be removed from the combined temperature and strain effects detected by the tightly-coupled fiber pair(s) to arrive at measurements representative primarily of strain.

In some embodiments, each of cables 20, 30 shown in FIG. 1 may comprise a single mode optical fiber paired with a multi-mode optical fiber loop. Light transmission in the multi-mode fiber can be used to obtain distributed temperature measurements based on Raman scattering using a technique which may be referred to as distributed temperature sensing (DTS). DTS may be used to make temperature measurements, distributed across the length of a multi-mode optical fiber, which may be dependent on temperature but not on physical strain. A Raman DTS interrogator unit (not shown) may be connected to the multi-mode fiber and may complete sweeps of the multimode fiber in each of cables 20, 30 to obtain distributed temperature measurements. These distributed temperature measurements may be used to isolate the temperature effects in the measurements corresponding to the Brillouin single mode optical fiber in each of cables 20, 30 to produce measurements representative primarily of strain.

Systems 10 and 100 of the illustrated embodiment comprises a monitoring subsystem 40 which detects longitudinal and/or transverse stretching and compression of the Brillouin fibers 20, 30 caused by displacement/strains in the surrounding material of dam 12A. Monitoring subsystem 40 comprises an interrogation unit 42 which may be implemented by one or more suitably configured programmed and/or programmable data processors 42A and suitable signal conditioning circuitry. Interrogation unit 42 may continuously scan fiber lines 20, 30 to locate fiber deformations caused by surface and sub-surface strains in the ground in a vicinity of dam 12A. In some embodiments, interrogation unit 42 may be sensitive to strains of less than 0.01%. In some embodiments interrogation unit 42 may comprise an optical interrogator such as a Brillouin frequency domain interrogator which may scan fiber lines 20, 30 using a BOFDA approach. In some embodiments, interrogation unit 42 may additionally or alternatively comprise a Brillouin time domain interrogator, or may employ Brillouin optical correlation domain analysis/reflectometry or Brillouin optical time domain analysis/reflectometry. By employing a frequency domain interrogator, monitoring system 40 may be capable of obtaining a spatial resolution, across the Brillouin fibers 20, 30, of less than 1 m in length and a precision of approximately 0.001%. Interrogation unit 42A may capture and, in some embodiments, record event time, location and/or amplitude of movements of structure 12. Appropriate trigger levels for taking action may be established, so that monitoring system 10 uses alarms, electronic messaging and/or other suitable techniques to alert persons and/or other systems (not shown) to take appropriate actions. In one embodiment, interrogator unit 42A may trigger an alarm as soon as a threshold level of strain is exceeded at any location along fiber 20, 30. Under noncritical conditions the data may be continually processed on a discrete time basis to yield a strain magnitude contour plot of the face 13A (or face 113A), the dam crest 14 the dam benches, and/or any other portion of slope 12, 112 having a subsystem installed thereon or therein.

Interrogator unit 42 may complete sweeps of the fiber loops 20, 30 to which it is attached. The layout of fiber 20, 30 permits interrogator unit 42 to gather data at distributed locations with a spatial resolution of approximately 1 m in length or less along a cable up to a range of 10-20 km or more. The distributed monitoring provided by system 10 allows measurement/estimation of both strain and temperature across the length of fibers 20, 30 from one or more central locations. As discussed above, interrogator unit 42 may use temperature readings to adjust the strain measurements/estimates to compensate for the effect of temperature and to thereby create generally temperature independent estimates of the strain throughout system 10. Temperature measurements may also be used independently for geotechnical investigations. Anomalies in ground temperature data may be associated with localized ground water movement and may indicate undesired flow of liquids around or underneath the impoundment structure or beneath the surface of the slope. In some embodiments, such as the FIG. 1B embodiment, changes of temperature may indicative of leakage of a pipeline (e.g. pipeline 112A).

Figure 4D:
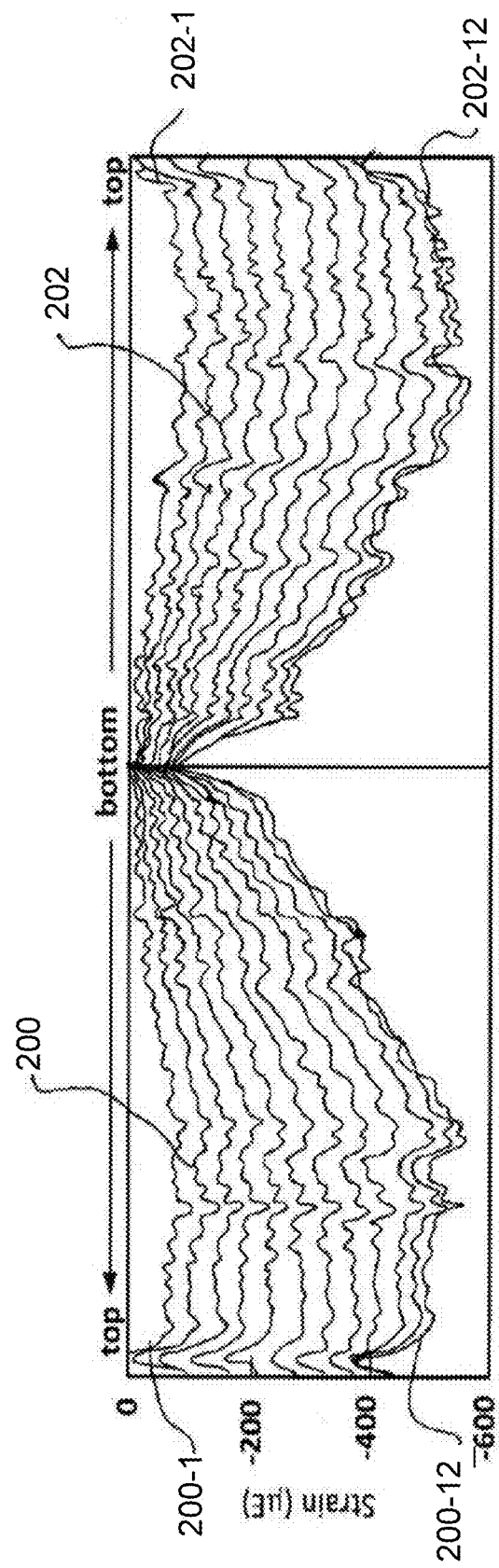
FIG. 4D is simulation data from a borehole installation in which a pair of loops of fiber optic line run down and then back up a borehole.

FIG. 4D shows exemplary simulated data from a borehole installation (e.g. one of boreholes 24 of systems 10, 100 described herein) in which the fiber optic line 20 has been run down borehole 24 and then back up the same axis. To show movement over time, multiple traces 200 of data are over overlaid in FIG. 4D. The strain of each trace 200, 202 is measured relative to a baseline dataset. At a time, $t_1$, trace 200-1 shows the strain of first fiber optic line 20-1 along the depth of borehole 24 from the top to the bottom (e.g. from the left side to the middle of the chart of FIG. 4D). At time, $t_1$, trace 202-1 shows the strain of second fiber optic line 20-2 along the depth of borehole 24 from the bottom to the top (e.g. from the middle to the right side of the chart of FIG. 4D). Trace 200-2 shows the strain of first fiber optic line 20-1 at a time, $t_2$, along the depth of borehole 24 from the top to the bottom (e.g. from the left side to the middle of the chart of FIG. 4D). Trace 202-2 shows the strain of second fiber optic line 20-2 at time, $t_2$, along the depth of borehole 24 from the bottom to the top (e.g. from the middle to the right side of the chart of FIG. 4D). As can be seen from FIG. 4D, the strain along each of fiber optic cable 20-1 and 20-2 increases from $t_1$ to $t_2$ (except at the bottom of borehole 24). Moreover, as time increases to $t_{12}$, as represented by 200-12, 202-12, the strain along fiber optic cable 20 (except at the bottom of borehole 24) continues to increase as can be seen by comparing trace 200-12 to traces 200-1, 200-2. The exemplary simulated data of FIG. 4D therefore shows evidence of progressive movement over time. Although not depicted, a similar data set may be attained from subsystem 10B showing the strain at different locations on slope 12 over time.

Interrogation unit 42 (and/or some other suitably connected computer or the like) may continuously analyze recorded data (on a discrete time basis) to identify rapid changes in strain or temperature within the slope 12. Interrogation unit 42 (or some other suitably connected computer or the like) may additionally or alternatively process recorded data to yield reports indicating long term changes within the slope 12. Interrogation unit 42 (or some other suitably connected computer or the like) may additionally or alternatively process strain data to yield strain magnitude contour plots of the surface(s) and/or interior of slope 12. For example, interrogation unit 42 (or some other suitably connected computer or the like) may be configured to output three-dimensional representations of one or more of strain and temperature distribution within slope 12. The strain data and data indicating internal displacement can be reviewed to show long term trends. Ground movement data collected in this manner can be used to identify incremental changes in slope 12. Since dam and slope failures tend to be incremental, data of the type shown in FIG. 5B can assist in identifying potential points of failure.

FIG. 5B shows a cumulative strain contour plot for pipeline 112A indicating regions 50 experiencing greater strain around the circumference of pipeline 112A and along the length of pipeline 112A as measured by optical fibers 130 (such as those depicted in FIG. 5A). Strain data collected in this manner can be used to identify incremental changes in pipeline 112A. Since pipeline failures tend to be incremental, data of the type shown in FIG. 5B can assist in identifying potential points of failure.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, color-grading tools, video projectors, audio-visual receivers, displays (such as televisions), digital cinema projectors, media players, and other devices suitable for the purposes described herein. Those skilled in the relevant art will appreciate that aspects of the system can be practised with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, mini-computers, mainframe computers, and the like.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A system for monitoring structural integrity of a slope, the system comprising:
   one or more loops of single mode optical fiber in contact with the slope, the one or more loops of single mode optical fiber comprising a jacket and an optical core and wherein the jacket is closely coupled to move with the optical core for transferring external strain to the optical core;
   a Brillouin frequency domain interrogator for measuring strain at one or more locations along a length of the one or more loops of single mode optical fiber; and
   a second loop of optical fiber alongside the one or more loops of single mode optical fiber comprising a second jacket and a second optical core and wherein the second jacket is loosely coupled to the second optical core such that the second loop of optical fiber is less sensitive, than the one or more loops of single mode optical fiber, to external strain.

2. The system of claim 1 wherein measurements from the second loop of optical fiber are compared to measurements from the one or more loops of single mode optical fiber to arrive at measurements representative primarily of strain without the effect of temperature.

3. A system according to claim 1 wherein at least one of the one or more loops of single mode optical fiber are embedded in one or more substantially vertical boreholes formed in the slope.

4. The system of claim 3 wherein at least one of the one or more substantially vertical boreholes extends substantially vertically from a crest of the slope and into the slope.

5. The system of claim 3 wherein at least one of the one or more substantially vertical boreholes extends substantially vertically from a generally horizontal bench on a face of the slope.

6. The system of claim 5 wherein the one or more benches are on a downstream surface of the slope.

7. The system of claim 3 wherein the substantially vertical boreholes extend downwardly to a stable foundation underlying the slope.

8. The system of claim 7 wherein the stable foundation comprises one or more of: bedrock and stable ground predating the formation of the slope.

9. The system of claim 1 wherein the Brillouin frequency domain interrogator measures temperature at one or more locations along a length of the one or more loops of single mode optical fiber.

10. The system of claim 1 wherein at least one of the one or more loops of single mode optical fiber comprises one or more elongated sections, each elongated section is located in a corresponding substantially horizontally elongated channel embedded in the slope.

11. The system of claim 10 wherein the one or more substantially horizontally elongated channels are disposed substantially parallel to a crest of the slope.

12. The system of claim 11 wherein each elongated section is embedded in a corresponding channel disposed substantially parallel to a gradient of the slope.

13. The system of claim 11 wherein each elongated section is embedded in a corresponding channel disposed substantially transverse to a gradient of the slope.

* * * * *